United States Patent
Bjornson

(10) Patent No.: US 6,550,779 B2
(45) Date of Patent: Apr. 22, 2003

(54) MECHANICAL SPLIT SEAL

(75) Inventor: Carl C. Bjornson, Tiverton, RI (US)

(73) Assignee: Northeast Equipment, Inc., Fall River, MA (US)

( * ) Notice: Subject to any disclaimer, the term of this patent is extended or adjusted under 35 U.S.C. 154(b) by 0 days.

(21) Appl. No.: 09/992,968

(22) Filed: Nov. 5, 2001

(65) Prior Publication Data

US 2002/0036383 A1 Mar. 28, 2002

Related U.S. Application Data

(63) Continuation of application No. 09/362,171, filed on Jul. 27, 1999.

(51) Int. Cl.⁷ .............................. F16J 15/34; F16L 55/00
(52) U.S. Cl. ..................... 277/370; 277/372; 277/373; 277/545; 285/148.22
(58) Field of Search .................. 285/148.22, 148.23; 277/370, 371, 372, 373, 543, 358, 306, 546, 547, 548

(56) References Cited

U.S. PATENT DOCUMENTS

| | | | |
|---|---|---|---|
| 808,082 A | 12/1905 | Fuller | |
| 1,467,256 A | 9/1923 | Thomson | |
| 1,544,609 A | 7/1925 | Somes | |
| 3,025,070 A | 3/1962 | Copes | |
| 3,066,942 A | 12/1962 | Schwing | |
| 3,101,200 A | 8/1963 | Tracy | |
| 3,421,769 A | 1/1969 | Boop et al. | |
| 3,599,990 A | 8/1971 | Greiner et al. | |
| 3,715,169 A | 2/1973 | Molis | |
| 3,770,301 A | * 11/1973 | Adams | ........................ 285/15 |
| 4,088,329 A | 5/1978 | Junker | |
| 4,174,844 A | 11/1979 | Zobens | |
| 4,253,713 A | 3/1981 | Chambers, Sr. | |

(List continued on next page.)

FOREIGN PATENT DOCUMENTS

| | | |
|---|---|---|
| EP | 0 619 448 A1 | 10/1994 |
| GB | 1043184 | 9/1966 |
| GB | 1142328 | 2/1969 |
| WO | WO 89/02999 | 4/1989 |
| WO | WO 97/04256 | 2/1997 |
| WO | WO 99/11953 | 3/1999 |
| WO | WO99/31414 | 6/1999 |

OTHER PUBLICATIONS

A.E.S. Engineering Ltd. AESSEAL Radially Separated Seal. Five pages.
Durametallic Corporation. PSS.. The Ideal Split Seal for Rotating Equipment in All Types of Processing Industries. 1990 Three pages.

*Primary Examiner*—Anthony Knight
*Assistant Examiner*—Vishal Patel
(74) *Attorney, Agent, or Firm*—Kenneth P. Robinson

(57) ABSTRACT

A split seal component including a seal face comprising two seal face segments rigidly mounted in two holder halves and methods of assembly and installation. The seal face segments may each have a nose that is held snugly by each holder half and is supported axially. Aligning pins received in aligning holes of the holder halves may be used to align the face segments. A fixture may be used to axially align the seal segments. A split o-ring and inner axial wall may be included that position the seal face concentrically with a shaft. Each holder half may have an integral band that clamps and also positions the face segments concentrically with the shaft. The walls of the holder halves may be stress-relieved proximate the junctions of the holder halves. A kit is provided for a rotary seal component with a rigidly mounted seal face.

Another seal component includes a seal face comprising two seal face segments resiliently mounted in two holder halves. Each seal face segment has a ridge that abuts against a split o-ring positioned in a recess in an outer wall of each holder half. An inner axial wall maintains the axial alignment of the seal face segments and, in conjunction with the split o-ring, retains the seal face and a biasing device in the holder half.

31 Claims, 15 Drawing Sheets

U.S. PATENT DOCUMENTS

| | | | |
|---|---|---|---|
| 4,261,582 A | | 4/1981 | Womack |
| 4,336,944 A | | 6/1982 | Blair |
| 4,343,479 A | | 8/1982 | Fukuoka et al. |
| 4,355,519 A | | 10/1982 | Kercheval et al. |
| 4,408,788 A | * | 10/1983 | Beukema .................... 285/419 |
| 4,410,188 A | | 10/1983 | Copes |
| 4,415,165 A | | 11/1983 | Martini |
| 4,434,125 A | | 2/1984 | Lavender et al. |
| 4,533,149 A | | 8/1985 | Vater et al. |
| 4,548,560 A | | 10/1985 | Kanao |
| 4,576,384 A | | 3/1986 | Azibert |
| 4,580,788 A | | 4/1986 | Rabe et al. |
| 4,583,748 A | | 4/1986 | Weichenrieder, Sr. |
| 4,746,268 A | | 5/1988 | Sugimoto et al. |
| 4,840,384 A | | 6/1989 | Dorsch |
| 4,858,936 A | | 8/1989 | Adams |
| 4,940,261 A | * | 7/1990 | Somers Vine ............... 285/112 |
| 5,020,809 A | | 6/1991 | Mullaney |
| 5,067,733 A | | 11/1991 | Nagai et al. |
| 5,114,163 A | | 5/1992 | Radosav et al. |
| 4,576,384 A | | 6/1992 | Azibert |
| 5,122,122 A | | 6/1992 | Allgood |
| 5,188,377 A | | 2/1993 | Drumm |
| 5,192,085 A | | 3/1993 | McOnie |
| 5,199,720 A | | 4/1993 | Radosav et al |
| 5,232,451 A | | 8/1993 | Freitas et al. |
| 5,294,132 A | | 3/1994 | Duffee et al. |
| 5,330,497 A | | 7/1994 | Freitas et al. |
| 5,354,070 A | | 10/1994 | Carmody |
| 5,370,401 A | | 12/1994 | Sandgren |
| 5,403,020 A | | 4/1995 | McOnie |
| 5,415,435 A | * | 5/1995 | Colbert ....................... 285/23 |
| 5,490,682 A | | 2/1996 | Radosav et al. |
| 5,556,110 A | | 9/1996 | Marsi et al. |
| 5,571,268 A | | 11/1996 | Azibert |
| 5,615,893 A | | 4/1997 | Reagan |
| 5,662,340 A | | 9/1997 | Bessette et al. |
| 5,673,923 A | | 10/1997 | Watanabe et al. |
| 5,711,532 A | | 1/1998 | Clark et al. |
| 5,716,054 A | | 2/1998 | Duffee et al. |
| 5,725,220 A | | 3/1998 | Clark et al. |
| 5,803,169 A | | 9/1998 | Bassinger et al. |
| 5,820,129 A | | 10/1998 | Reagan |
| 5,863,047 A | | 1/1999 | Ellis |
| 5,913,520 A | | 6/1999 | Clark et al. |
| 5,913,521 A | * | 6/1999 | Sangren et al. ............. 277/372 |
| 5,961,122 A | | 10/1999 | Marsi |

* cited by examiner

MECHANICAL SPLIT SEAL

RELATED APPLICATIONS

This is a continuation of copending application Ser. No. 09/362,171 filed Jul. 27, 1999.

SEQUENCE LISTING (Not Applicable)

FEDERALLY SPONSORED RESEARCH (Not Applicable)

BACKGROUND OF THE INVENTION

The present invention relates to mechanical split seals. Mechanical split seals are employed in a wide variety of equipment, such as pumps, to provide a pressure-tight and fluid-tight seal between one environment having a pressurized process fluid and an external environment containing the equipment. The split seal assembly is usually positioned about a rotating shaft that is mounted in and protruding from a stationary part of the equipment.

Conventional split seal assemblies include face type mechanical seals, which have a pair of seal faces that are concentrically mounted about the shaft. The seal faces have smooth radial primary sealing surfaces that are in contact with each other. Usually one seal face remains stationary while the other seal face rotates with the shaft. The split seal assembly prevents leakage of the pressurized process fluid to the external environment by biasing the seal faces in contact with each other. For example, a split seal assembly may include one or more springs, which urge the seal faces together.

The rotary seal component includes a rotary seal face which is usually mounted in a rotary holder. The rotary holder includes a pair of holder halves, each having a pair of mating surfaces, that are fastened together. A set screw is generally used to secure the rotary seal component to the shaft. The stationary seal face is usually mounted in a piece called a gland. The gland also includes a pair of holder halves, usually referred to as gland halves, each having a pair of mating surfaces that are fastened together. In an assembled split seal, the rotary seal component is disposed within the gland, so that the primary sealing surfaces contact one another.

The mating surfaces of the rotary and stationary holder halves are normally manufactured to tight tolerances. Typically, each holder half has a groove formed on one of the mating surfaces for mounting a sealing gasket. When the gasket is mounted within the groove and the halves are secured together, the gasket contacts the opposite mating surface of the half. This contact forms a pressure-tight and a fluid-tight seal between the halves.

The seal faces are often divided into segments, each segment having two split surfaces. Because the seal faces are split, they can be mounted about the shaft without freeing one end of the shaft. Frequently, the split between the split surfaces is angularly offset from the junction between the mating surfaces. The split seal assembly has a distinct advantage over non-split mechanical seal designs in that the total time to install the seal is reduced because the rotating equipment does not have to be dismantled.

SUMMARY OF THE INVENTION

Axial alignment of the primary sealing surfaces and concentricity of the seal faces with the shaft are conducive to forming a good seal. Maintenance of the axial alignment and concentricity retains a good seal under pressure.

Axial alignment may be easily and quickly achieved by seating the seal face of one of the seal components rigidly in the holder halves. By providing circumferential axial support for this seal face, distortion of the primary sealing surfaces even under high pressures may be reduced or eliminated. The holder halves may be configured to form the seal face concentrically with the shaft and to maintain the concentricity under pressure. The face of the other seal component may be resiliently supported.

In one aspect, a seal component has a circular seal face and first and second holder halves. Each seal face includes two seal face segments. Each seal face segment has a primary sealing surface. A section extends axially from each primary sealing surface and a nose extends radially from each section. The nose of each seal face segment is mounted within each holder half. The seal face may be rigidly mounted.

Each holder half may have a recess. The nose of one of the seal face segments may be within the recess. The nose contacts against a lip of the recess when pressure is applied to the seal face in a direction opposing the primary sealing surfaces.

Each holder half may include a channel having an inner axial wall and an outer wall. One of the seal face segments may be within the channel.

Each holder half has first and second mating surfaces. An aligning pin may extend from each of the second mating surfaces. Each of the first mating surfaces may have an aligning hole which snugly receives one of the aligning pins. When the holder halves are positioned such that each of the aligning pins is received within each of the holes, the holder halves are axially and radially aligned with each other, and the aligning pins are retained within the holes upon release of the holder halves.

The seal component may further include a split o-ring between an inner wall of the section extending from the primary sealing surface and a rotating shaft upon which the seal component is mounted. The split o-ring centers the seal face with the shaft. Alternatively, the split o-ring may be in a recess in the inner wall. In another configuration, the inner wall includes an axial wall and a conical wall, the conical wall extending from the axial wall. The split o-ring is against the conical wall.

In another aspect, a seal component has two seal face segments and first and second holder halves. Each seal face segment includes a primary sealing surface and a section extending from each primary sealing surface. Each section has an outer wall. Each holder half includes first and second mating surfaces and an integral band having an inner wall. The inner walls surround the outer walls and secure the seal face segments rigidly and concentrically around a rotating shaft.

Each of the integral bands may be attached to each of the holder halves at each of the first mating surfaces. The inner walls and the outer walls may be, for example, semi-cylindrically shaped or semi-conically shaped. Each integral band may have a first and a second flanged section. The second flanged section may have a lip protruding from an outer edge. The first flanged section may have a complementary notch. The lip of each integral band is in the notch of the other integral band.

In yet another aspect, a seal component comprises a seal face and first and second holder halves. Each half includes first and second mating surfaces and an outer wall. Each of the walls extends from the first mating surface to the second mating surface. The outer walls have a stress-relief proximate the first and second mating surfaces. Each half may further include an inner axial wall that has a stress-relief proximate the first and second mating surfaces.

In a further aspect, a rotary seal component kit comprises two rotary seal face segments and first and second rotary holder halves. Each seal face segment has a radial primary sealing surface, a section extending from the primary sealing surface and a nose extending radially from the section. The nose of each seal face segment is mounted within each holder half. Each holder half may have a recess with the nose of each of the seal face segments within each recess.

Each half may include an integral band which surrounds the section. Each holder half may have first and second mating surfaces, an inner axial wall and an outer wall. The inner axial wall and the outer wall may have stress-reliefs proximate the mating surfaces. A split o-ring may be on an inner wall of the section.

In still another aspect, a seal component includes two holder halves, a split o-ring, and two seal face segments. Each holder half includes an inner axial wall and an outer axial wall coaxial to the inner axial wall. Each outer axial wall has a groove. A split o-ring is in the grooves. Each seal face segment has a ridge. The segments are between the inner and outer axial walls of each half. Each segment is supported by at least one resilient support axially pushing the segment away from the holder half. The inner axial walls maintain the segments concentric with the shaft during assembly and installation and retain the resilient supports. The ridges abut against the split o-rings preventing the seal face segments from axially separating from the holder halves.

A method of assembling a seal component half includes inserting a split surface of a seal face segment into a channel of a holder half, so that a nose extending radially from the seal face segment enters a complementary recess in the holder half, and moving the seal segment along the channel until the seal face segment is fully seated in the holder half. The method may further include adhering a split o-ring to an inner wall of the seal face segment.

A method of assembly and installation of a seal component includes assembling first and second seal component halves and uniting the component halves around a shaft. The first component half includes a first holder half, and the second component half includes a second holder half. Each holder half has a counterbore and a seal face segment. A nose extends from each seal face segment. The nose is retained in the counterbore.

Each holder half may have a first and second mating surface. The second surface may have an aligning pin and the first surface may have an aligning hole. The uniting may further include inserting each of the aligning pins into each of the aligning holes. The method of assembly and installation may further include placing a fixture between each holder half and a radial surface opposing a primary sealing surface of each radial face segment. Insertion of the fixture axially aligns the seal face segments.

Another method of assembly and installation of a seal component includes inserting seal face segments into first and second holder halves. Each seal face segment has an outer peripheral surface. Each holder half has an integral band surrounding one of the outer peripheral surfaces. Next, the holder halves are placed around a shaft. Finally, the integral bands are fastened one to another.

A split seal assembly includes first and second seal components. The first seal component has a circular seal face with two seal face segments. Each seal face segment has a nose. The first seal component also has two holder halves. The nose of each seal face segment is mounted within each holder half. The second seal component includes a resiliently mounted seal face.

DETAILED DESCRIPTION

The following detailed description should be read in conjunction with the attached drawings in which similar reference numbers indicate similar structures.

Figure 1:
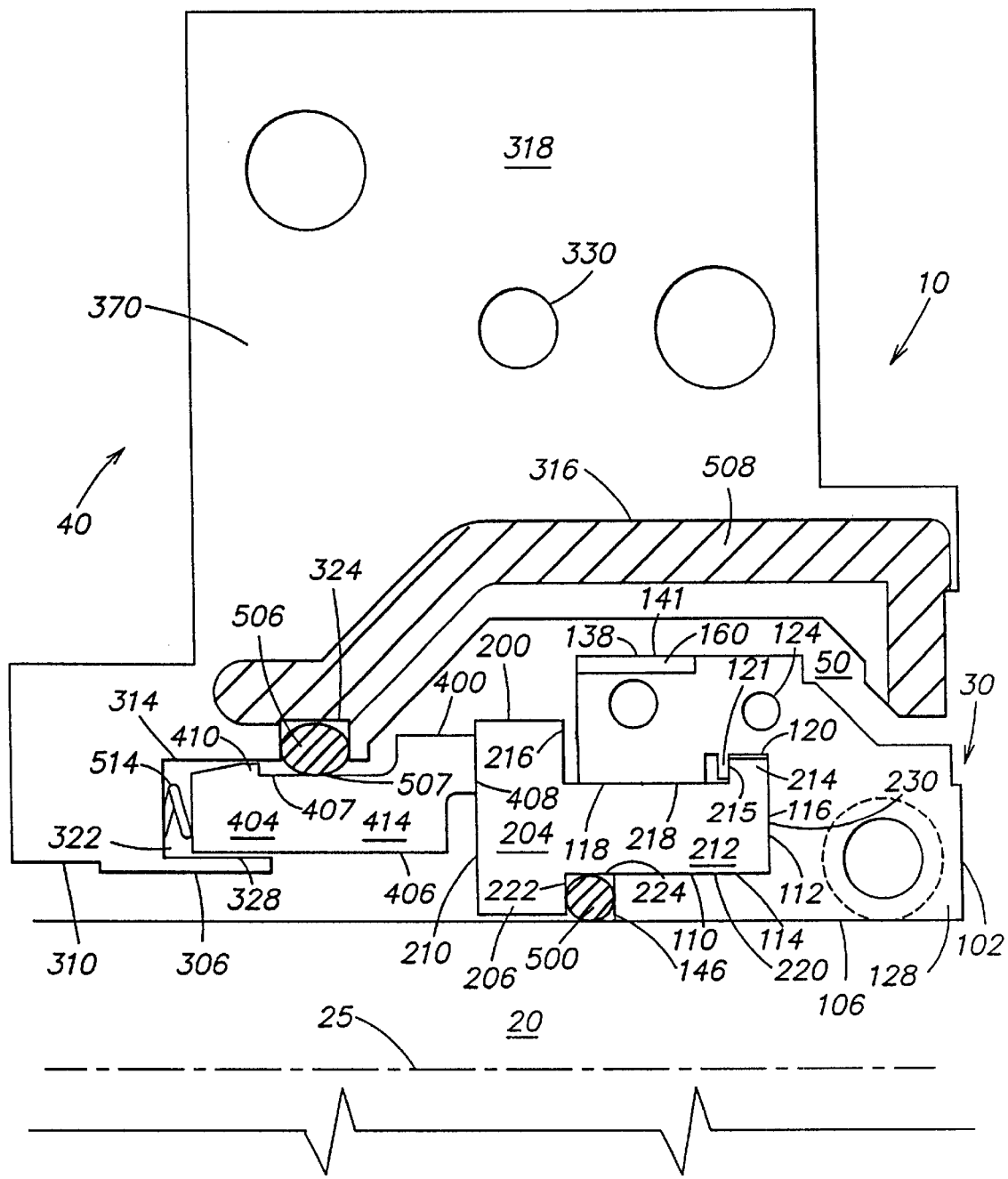
FIG. 1 is a side view of one quarter of a mechanical split seal assembly incorporating a rotary component with a rigidly seated seal face and a stationary seal component with a resiliently-mounted seal face.
Figure 2:
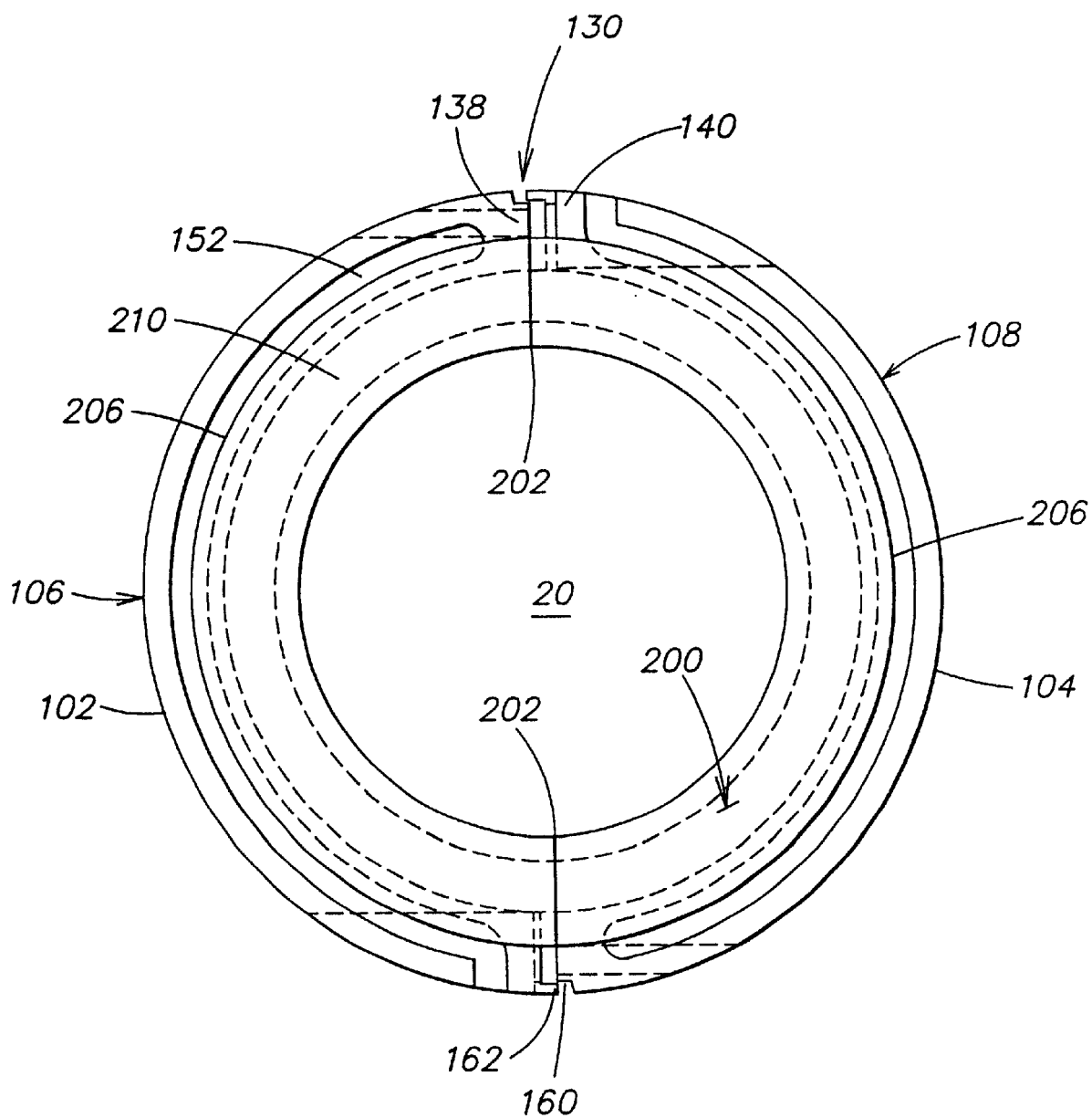
FIG. 2 is an axial view of the rotary seal ring component of FIG. 1.

As illustrated in FIG. 1, a split seal assembly 10 is formed by two seal components, a rotary component 30 that rotates with a shaft 20 and a stationary component 40, that does not rotate. Each component has a seal face 200, 400. For purposes of clarity, features of the rotary and stationary seal faces have numbers from 200 to 300 and from 400 to 500, respectively. Each seal face 200, 400 may be constructed of, for example, graphite-filled silicon carbide, silicon carbide or ceramic, in annular form and then fractured into two or more segments, as at rotary face splits 202 shown in FIG. 2. The split surfaces 204, 404 may be coarse, so that the face segments interlock as in a puzzle, or may be smooth.

The rotary seal face segments 206 are placed in rotary holder halves, 102, 104 and the stationary seal face segments 406, are mounted in stationary holder halves 310, 312 (shown in FIG. 15), usually referred to as gland halves. Again, for clarity, features of the rotary and stationary holder halves have numbers from 100 to 200 and from 300 to 400, respectively. The rotary and stationary holder halves are typically made of stainless steel and are manufactured using conventional CNC machining methods. Split o-ring 500 forms a seal between the rotary component 30 and the shaft 20. Split o-ring 506 is positioned between an outer axial wall 407 of the stationary seal face 400 and the stationary holder halves 310, 312. Gaskets 508 in grooves 316 on one of the gland mating surfaces 318 of each stationary holder half 310, 312 provide a seal between the holder halves 310, 312. Thus, assembly of the rotary and stationary components 30, 40 around the shaft 20 creates a sealed annular cavity 50.

In the split seal assembly shown in FIG. 1, the rotary and stationary seal components 30, 40 may comprise two unitized halves, with no loose parts, except fasteners, (not shown) that fit around a shaft 20 and form the split seal assembly 10. Because each half of the rotary seal component 106, 108 and each half of the stationary seal component 306 may be fully assembled before mounting to the shaft 20, the installation procedure is easy. A total of only four parts, excluding fasteners, may be manipulated during installation. The seal components create and maintain axial alignment and concentricity of the seal faces with the shaft even under high pressure operation.

Each rotary seal face segment 206 fits within and extends axially through a counterbore 110 in each rotary holder half 102, 104 to a radial primary sealing surface 210. In the configuration illustrated in FIG. 1, the counterbore 110 of each rotary holder half 102, 104 forms a channel 112 with an inner axial wall 114, extending to a radial wall 116, which meets an outer axial wall 118. The clearance between the inner wall 220 of the rotary face and the inner axial wall 114 of each rotary holder half 102, 104 is close with the exact clearance varying with the seal size, the smaller seals having less clearance. The close clearance between the inner wall 220 of the seal face and the inner axial walls 114 aids in holding the face 200 concentric with the shaft 20. If the clearance is too large, the face 200 may be eccentric to the shaft 20 possibly creating a leak point between the inner wall 220 of the face 200 and o-ring 500. It may also allow excessive movement of the face 200. If the clearance is too little, the inner axial wall 114 may bind on the face 200 and prevent face alignment during installation.

A recess 120 may be machined in the outer axial wall 118. The rotary seal face segments 206 may fit within the channel 112 and have a cylindrical section 212 extending axially from the primary sealing surface 210. The cylindrical section 212 may have a radially outwardly extending nose 214 that engages with the recess 120 in the channel 112. When the holder halves are connected around the shaft 20, the close fit between the nose 214 and the recess 120 axially aligns the primary sealing surfaces 210. If the clearance is too great, there may be excessive movement during start up, which may cause breakage of the face 200. If the clearance is too tight, the face segments 206 may not align properly with each other during installation. The appropriate clearance varies according to seal size.

Figure 3:
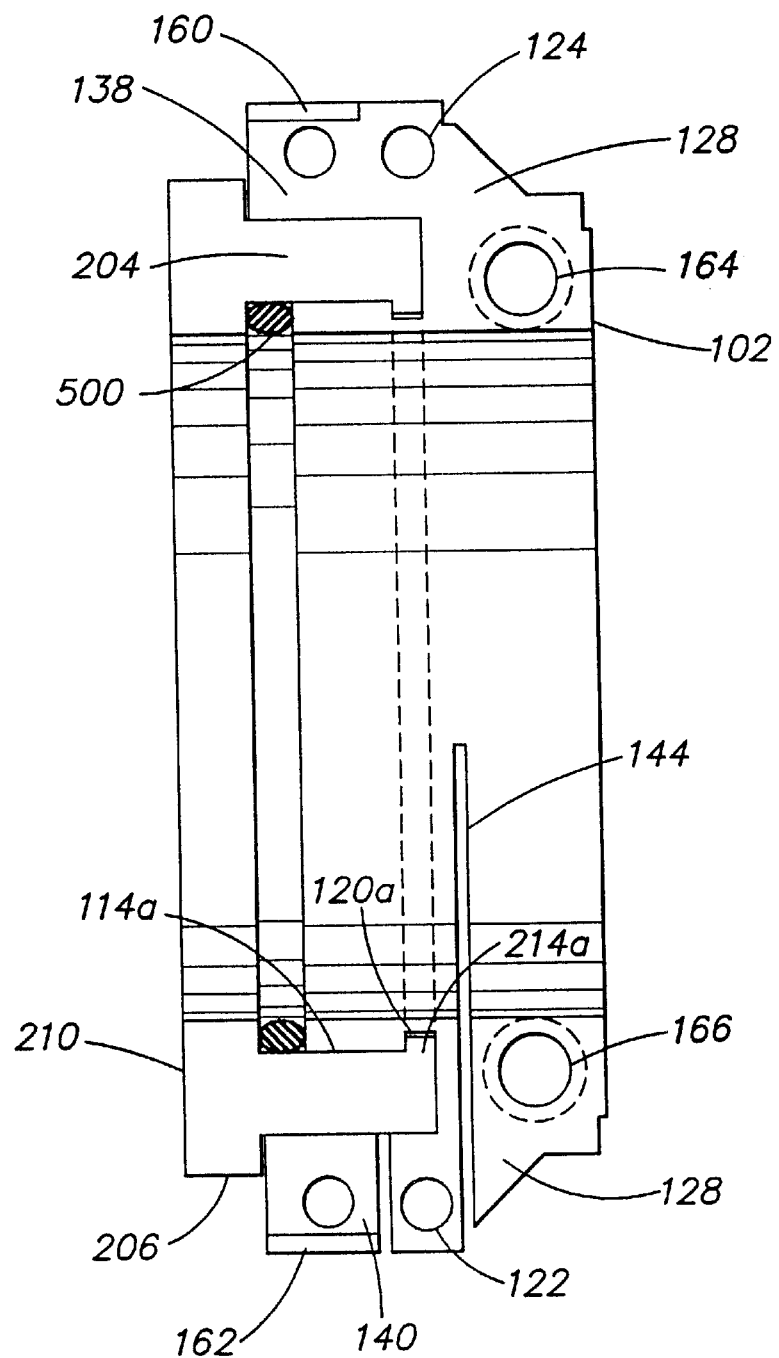
FIG. 3 is a side view of a rotary component half in which the nose extends radially inwardly.

A benefit of sealing the nose 214 in the recess 120 is that when axial force is applied to the outward radial surface 216 opposing the primary sealing surface, the forward radial wall 215 of the nose 214 bears against the rearward radial wall of a lip 121 of the recess 120. Because the force is borne along the 360 degree circumference of the seal face, areas of concentrated stresses are reduced, if not eliminated, resulting in minimal distortion even at higher pressures. Any distortion that does occur is localized in and around the nose 214 and does not translate to the primary sealing surface 210 even at higher pressures. Alternatively, as shown in FIG. 3, the nose 214*a* may extend radially inwardly and engage with a recess 120*a* in the inner axial wall 114*a*.

Figure 4:
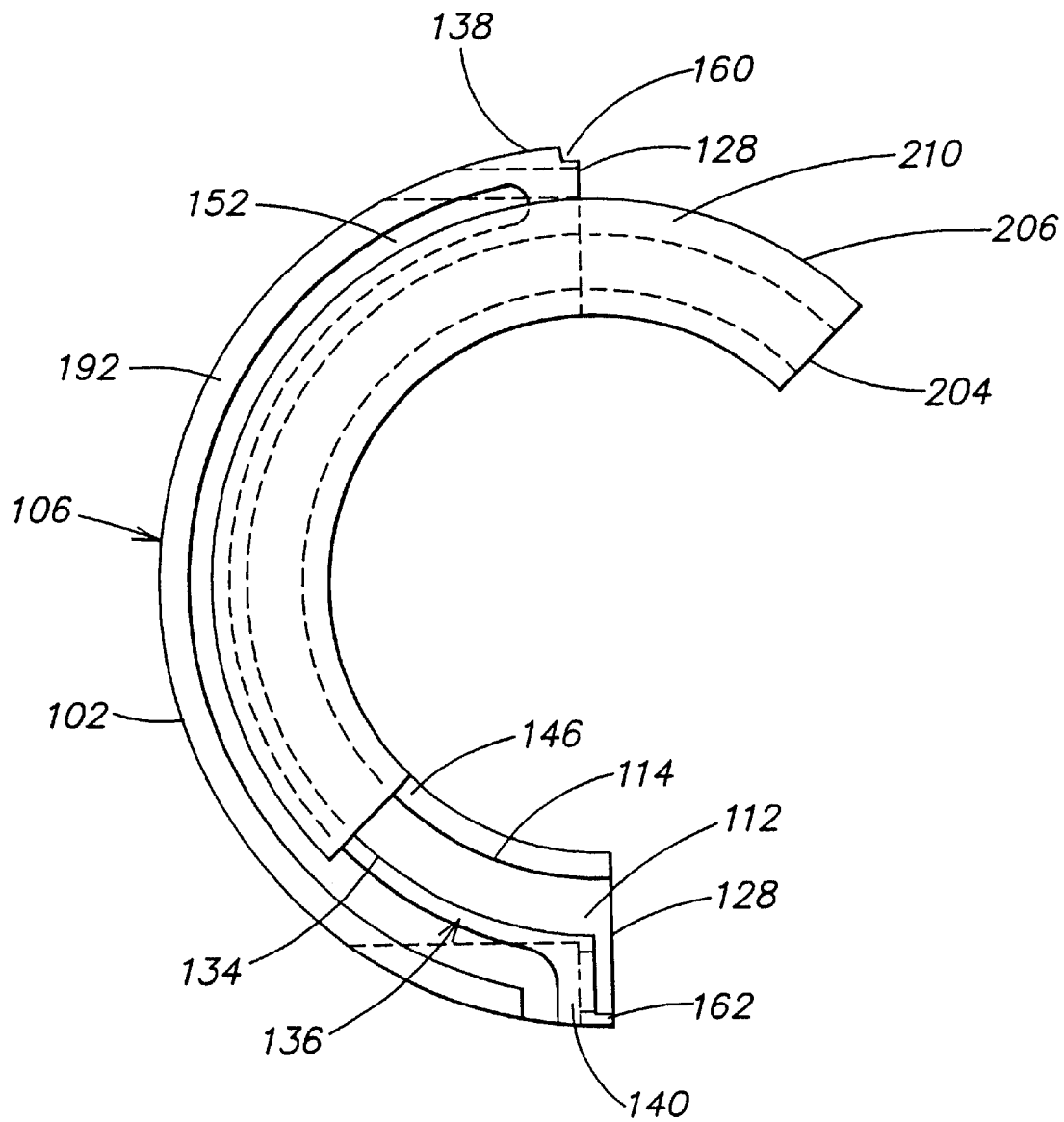
FIG. 4 is an axial view of half of the rotary seal component of FIG. 1 showing a rotary seal face segment partially inserted into a rotary holder half.

To fit the nose 214 within the recess 120, the seal face segments 206 are inserted into the channel 112 radially, with one split surface 204 entering the channel 112 first as shown in FIG. 4. The seal face segments 206 are then slid arcuately along the channel 112 until fully seated. The seal face segments 206, seated in the channel 112, are unlikely to be inadvertently dislodged. Thus, in such a configuration employing a channel 112 to house the face segments 206, separate handling and consequent damage of the face segments 206 during installation of the rotary seal component 30 is reduced.

Split o-ring 500 seated on the inner wall 220 of the rotary seal face 200 contributes to the face 200 being aligned concentrically with the shaft 20. Split o-ring 500 may be located at various axial locations between the seal face 200 and the shaft 20 as shown in FIGS. 1, 5, 6, and 8–9. If the rotary seal component 30 is secured around the shaft 20, the split o-ring 500 not only seals between the seal face 200 and the shaft 20 and resists rotation of the seal face relative to the shaft 20, but also helps to position the seal face 200 concentrically about the shaft 20. The inner axial wall 114 also contributes to concentricity between the seal face 200 and the shaft 20. The inner wall 220 of section 212 bears radially against the inner axial wall 114 and prevents the face 200 from being pulled eccentric to the shaft which could create a leak between the face and shaft, if the holder is tightened unevenly. The inner wall 220 also limits the amount of eccentricity of the face so that the face runs concentrically to the shaft.

Figure 5:
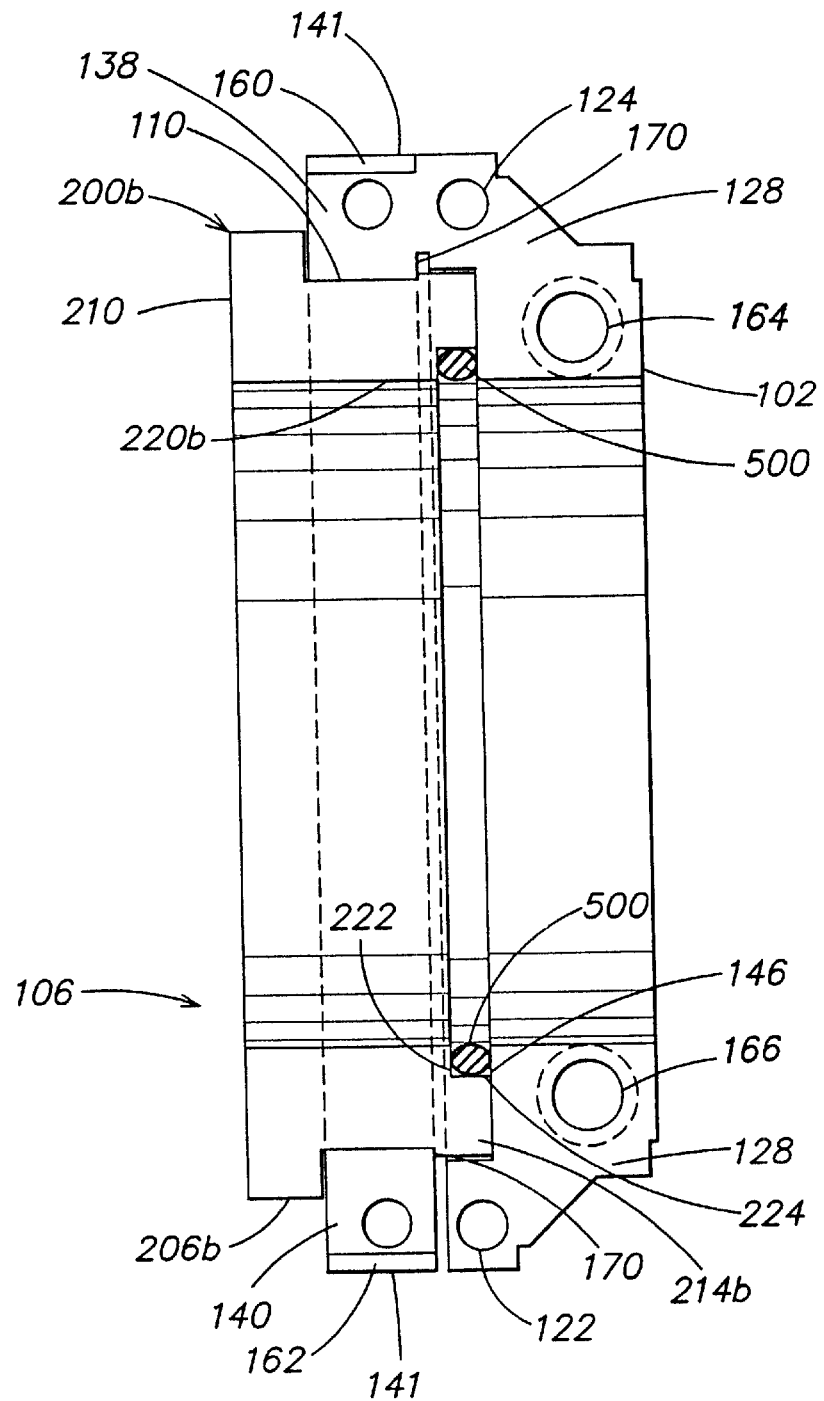
FIG. 5 is a side view of a rotary component half without an axial wall between the seal face and the shaft.

Alternatively, as shown in FIG. 5 the counterbore 110 may not include an inner axial wall. In such a configuration, a close fit between the inner axial wall 220*b* of the seal face and the shaft 20 may assist with achieving and maintaining concentricity between the seal face 200*b* and the shaft 20.

Alignment of the face segments 206 may be assisted by aligning pins 122. These pins may have chamfered or rounded ends, which may extend from one of the rotary holder mating surfaces 128 of each rotary holder half 102, 104. Aligning holes 124 may be bored in the other rotary holder mating surface 126 of each rotary holder half 102, 104. The aligning pins 122 and aligning holes 124 may have a snug fit with about a 0.0005 in. clearance such that insertion of the aligning pins 122 into the aligning holes 124 aligns the primary sealing surfaces 210.

The snug fit of the aligning pins 122 in the aligning holes 124 has the further advantage of providing for easy installation. If the rotary seal component halves 106, 108 are placed around the shaft 20 and the aligning pins 122 are inserted into the aligning holes 124, the rotary seal component 30 may be left on the shaft 20 or moved along the shaft 20 without becoming undesirably disengaged, even before the attachment of any fasteners.

Figure 6:
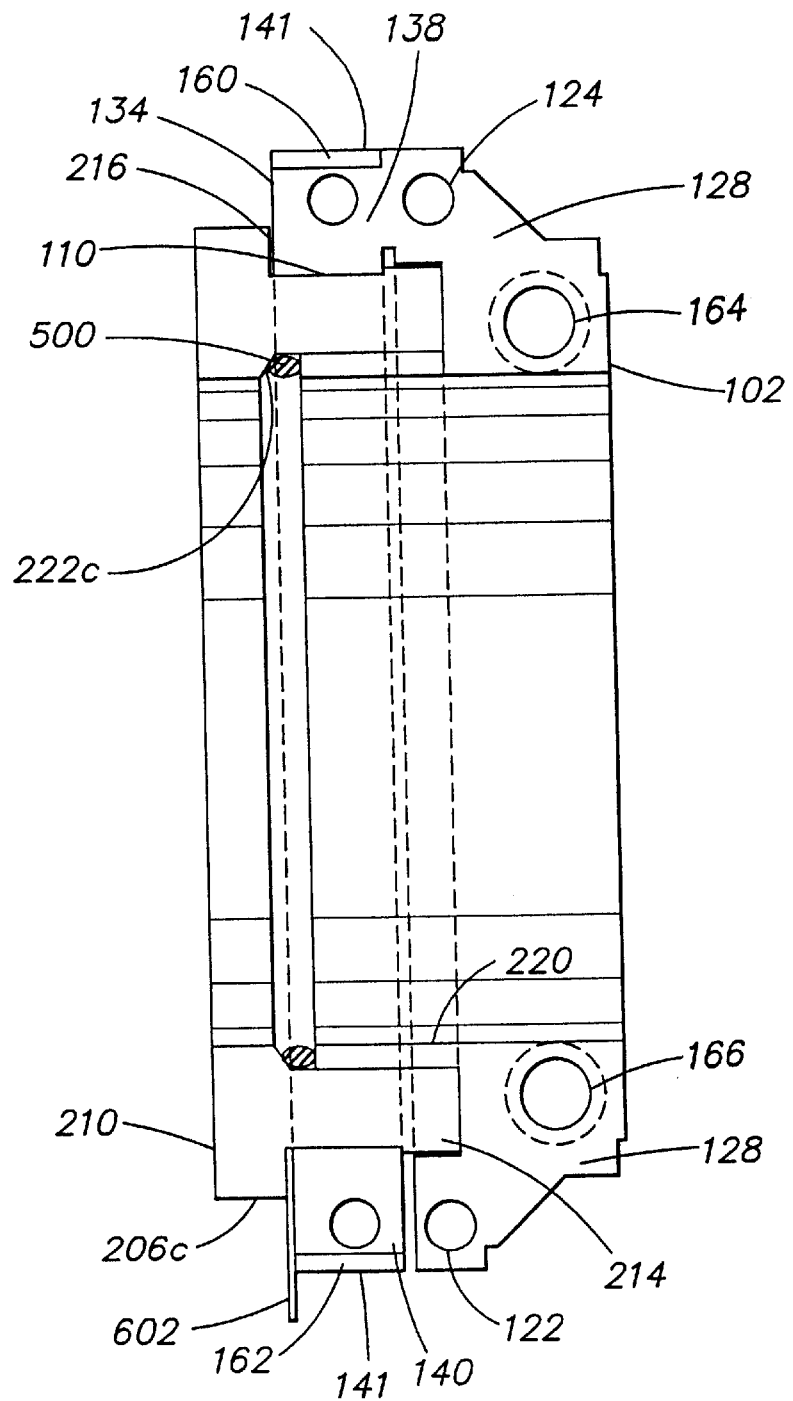
FIG. 6 is a side view of a rotary component half in which a seal face surface proximate a split o-ring is conically shaped.

Although, the insertion of the aligning pins 122 into the aligning holes 124 and the interaction of the nose 214 of the seal face 200 with the recess 120 of the rotary holder halves 106, 108 may satisfactorily align the primary sealing surfaces 210 when the two rotary component halves 106, 108 are connected, a final alignment may be warranted before fastening. A fixture 602 may be inserted as illustrated in FIG. 6, between a front edge 134 of the outer wall 118 of the counterbore 110, shown in FIG. 7, and an outer radial surface 216 opposing the primary sealing surface 210. The fixture 602 should be of such a thickness that if it is placed directly beneath one of the splits 202 between the rotary face segments 206c, the primary sealing surfaces 210 may be easily aligned axially.

Each rotary holder is formed as a cylinder and then divided into two holder halves 102, 104. A small amount of material may be removed from each mating surface 126, 128 of each holder half 102, 104. This helps to position the face 200 perpendicular and concentric with the shaft 20.

The seal face 200 may be clamped in position and formed concentrically about the shaft 20 by fastening together an integral band 136 of each rotary holder half 102, 104 around the outer periphery 218 of the cylindrical section 212 of the seal face 200. The integral bands 136 securely clamp the rotary face segments 206 together into a non-split configuration concentric with the shaft 20, and reduce relative axial or radial movement between the rotary face segments 206. Although a torque-wrench may be used to tighten the integral bands 136 to the same tightness at each junction, because other features may be included such as the split o-ring 500 and the inner axial wall 114 which contribute to forming the seal face concentrically with the shaft, identical tightness at the junctions of the integral bands is not critical to concentricity.

Figure 7:
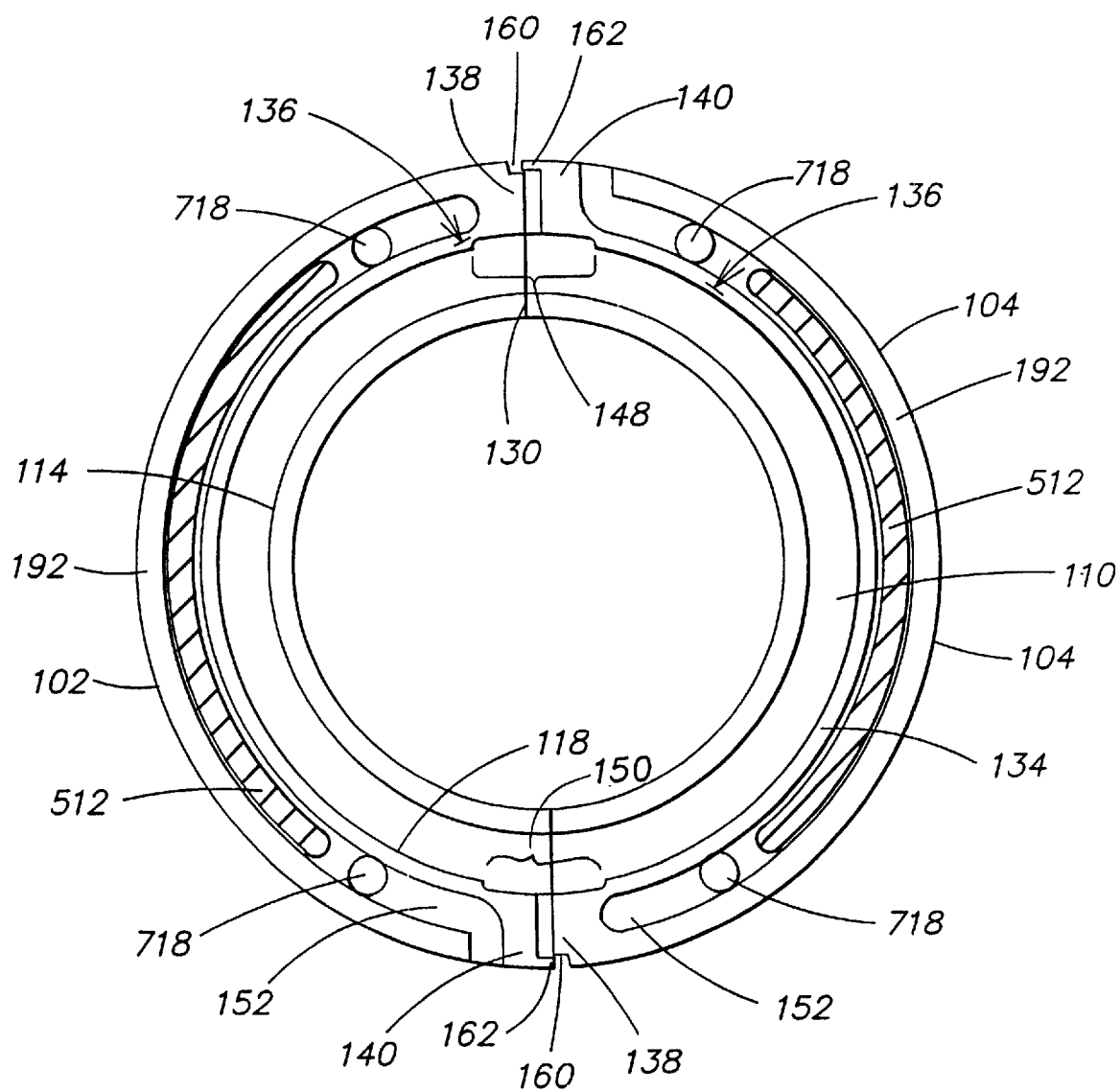
FIG. 7 is an axial view of two joined rotary holder halves of the type shown in FIG. 1, with seal face segments removed to illustrate stress-reliefs in inner and outer axial walls.
Figure 8:
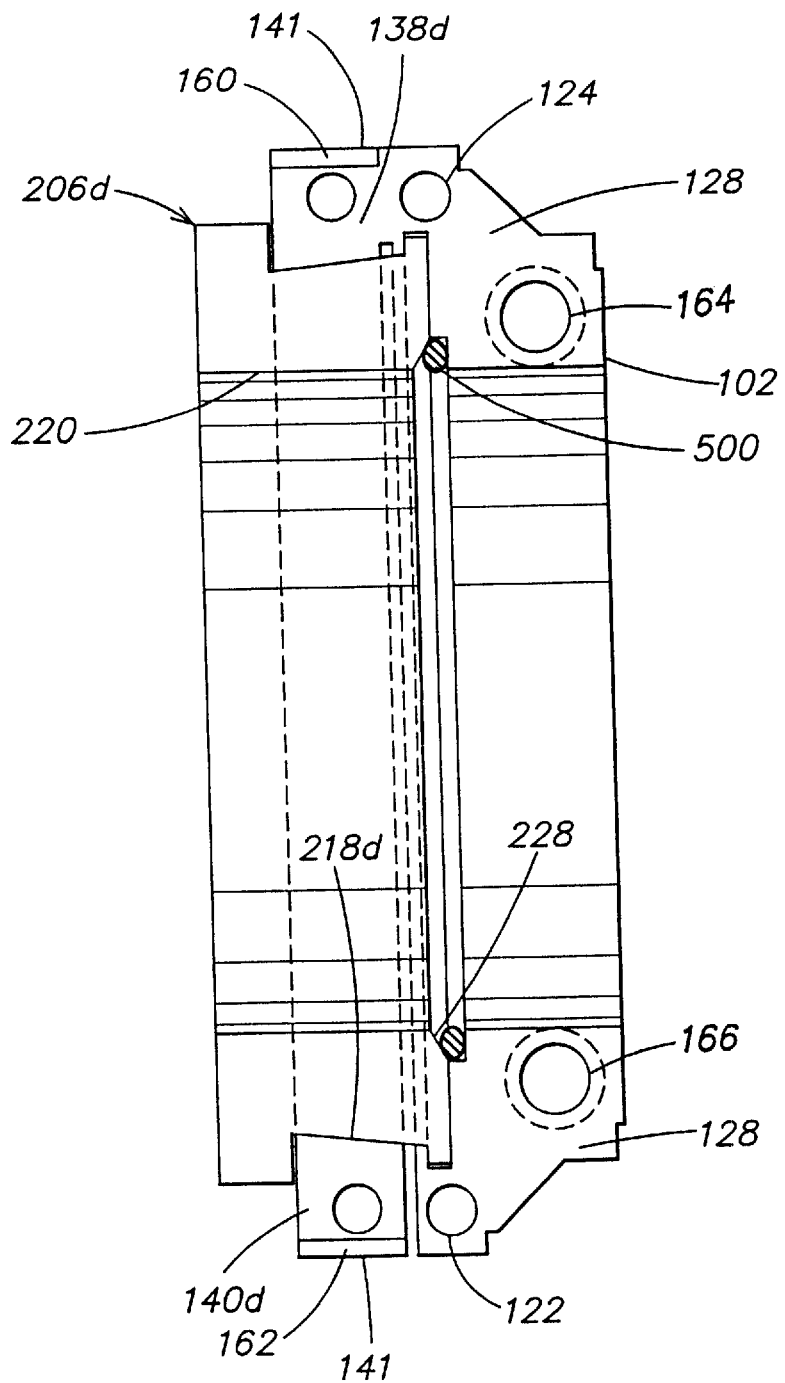
FIG. 8 is a side view of a rotary component half in which the outer periphery of the seal face is conically shaped and the back end of the seal face against which a split o-ring rests is also conically shaped.

As shown in FIG. 7, the integral band 136 may form a section of the outer axial wall 118 of the counterbore 110. A cylindrically-shaped integral band 136 or a conically-shaped integral band (not shown) may be used. The conically-shaped integral band is complementary in shape to a seal face segment 206d with a conically-shaped outer periphery 218d as shown in FIG. 8. A tight tolerance between the integral band 136 and the outer periphery 218 of the rotary face allows the band to accurately conform to the outer periphery with a minimum take up of the band when tightened. If the band 136 is too large or too small, the face 200 may not align perpendicular to and concentric with the shaft 20. The back edge of the integral band 136 may also serve as a stop for the nose 214b extending outwardly from the seal face segments as shown in FIG. 5.

Each integral band 136 may be attached to each rotary holder half 102, 104 proximate one of the rotary holder mating surfaces 126 and may be otherwise unattached. The cylindrically-shaped integral band 136 terminates in first and second flanged sections 138, 140 normal to the shaft 20. The conically-shaped integral band also terminates in first and second flanged sections 138d, 140d as shown in FIG. 8. Each second flanged section 140 may have a lip 162 protruding from an outer edge 141. Each first flanged section 138 may have a complementary notch 160. Screws or other fastening devices (not shown) are used to tighten the integral bands around the seal face evenly and equally. When the integral bands are tightened, lips 162 fit into notches 160 providing an interlock. This interlocking of the bands prevents the integral bands from twisting and driving inward towards the face possibly knocking it out of alignment. The interlock also reduces vibration and loosening of the screws.

One or more elastomeric strips or o-ring segments 512 may be inserted into each rotary holder half 102, 104, coaxial and outer to the outer axial wall 118 in an arcuate slot 152. The o-ring segments 512 may be stacked axially, one upon another within the slots 152. The o-ring segments 512 assist in assembly of the two halves 102, 104. The o-ring segments press against the outer axial wall 118 which forces the face segment 206 into a semi-circular shape and reduces the likelihood of the face segment sliding within the channel. When the two holder halves 102, 104 are brought together, because each face segment 206 is held in a semi-circular shape, the halves connect easily. The elastomeric strips or o-ring segments 512 also contribute to the concentricity of the seal face 200 by pressing against the outer axial wall 118, and may provide vibration dampening, as illustrated in FIG. 7.

In conventional split seals, high stress areas occur on the seal face 200 at or near the junctions 130 of the holder halves 102, 104. To reduce or eliminate these high stress areas and any resulting distortion of the seal face, the outer wall 118 may have a stress-relieved region 148 close to the junction 130 as shown in FIG. 7. The inner axial wall 114 (if one is present) may also have a stress-relieved region 150. These regions 148, 150 provide the added advantage of facilitating easy insertion of the seal face segments 206.

Figure 9:
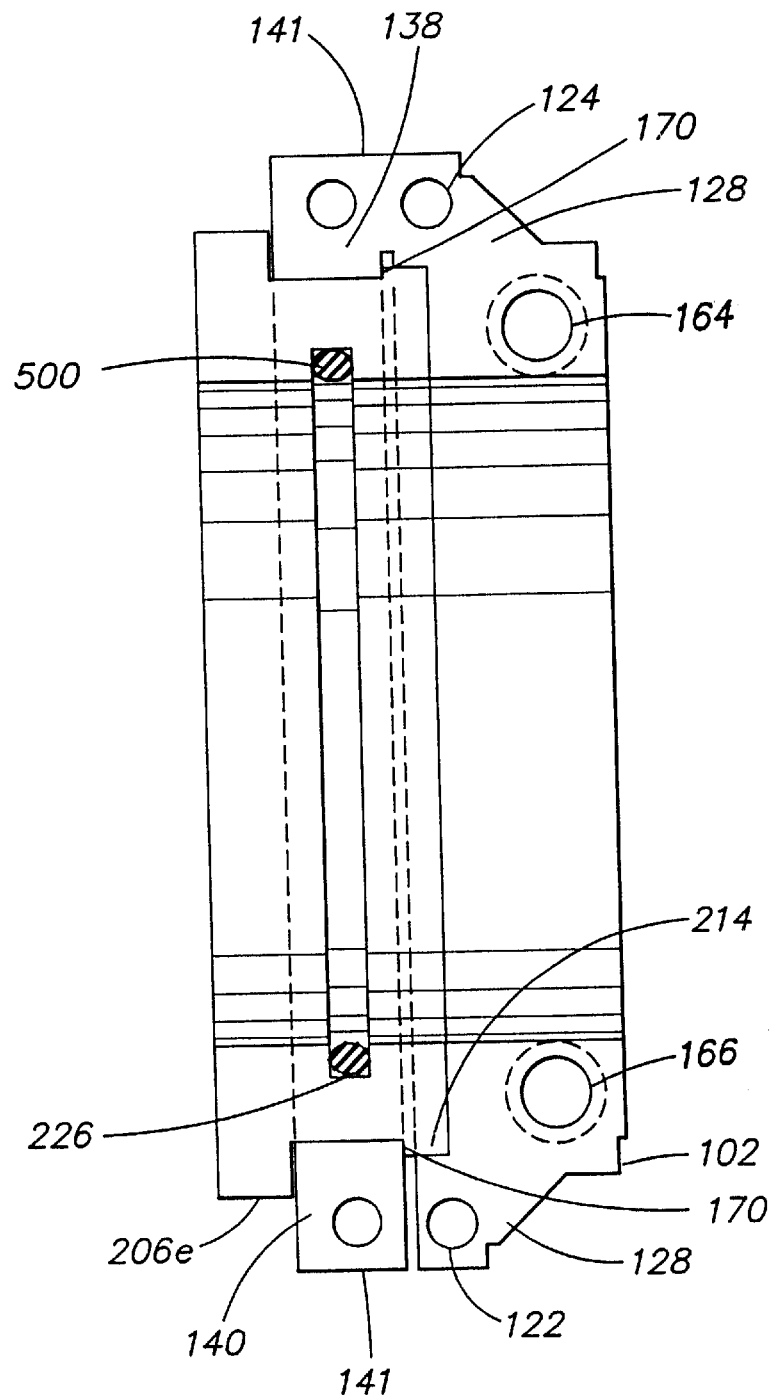
FIG. 9 is a side view of a rotary component half with a recess in the seal face within which a split o-ring is situated and in which a nose of the seal face bears against an integral band.

The features described above may be combined in various ways. The figures depict only a few of the many combinations envisioned. FIGS. 1, 5, 6, 8, 9 and 10 each depict a slightly different sealing configuration. In FIG. 1, the split o-ring 500 is situated on an inner wall 220 of the cylindrical section 212 between the front edge 146 of the inner axial wall 114 and an inner radial surface 222 opposing the primary sealing surface 210. In FIG. 6, the surface of the seal face segment 206c opposing the primary sealing surface 210 is a conical surface 222c rather than radial. In another configuration, shown in FIG. 8, the seal face segment 206d is machined with a conical back wall 228 against which the split o-ring 500 is placed. As shown in FIG. 5, a step 224 may be provided in the seal face segment 206b in which the split o-ring 500 may be situated. Alternatively, the split o-ring 500 may be seated in a recess 226 in the seal face segment 206e as shown in FIG. 9.

Figure 10:
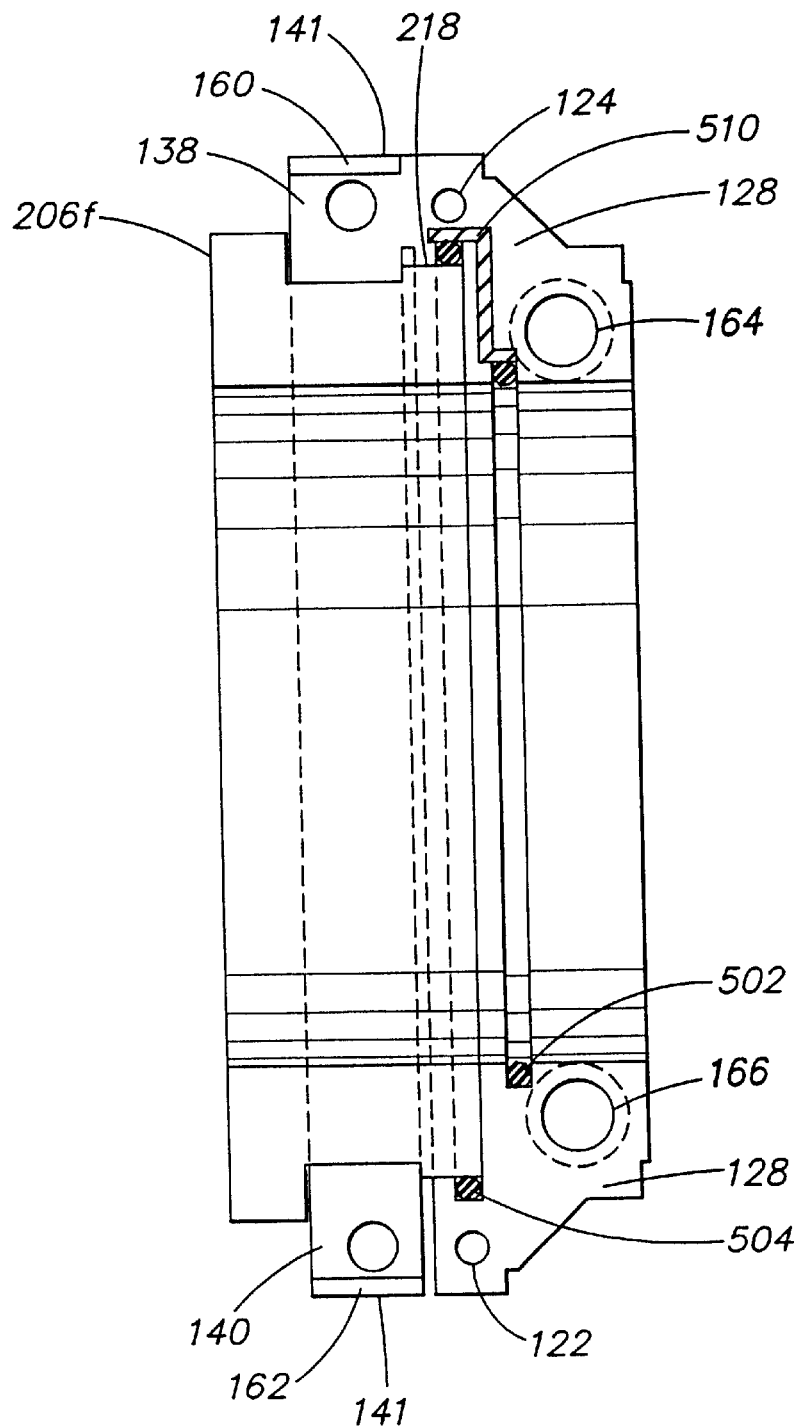
FIG. 10 is a side view of a rotary component half in which an inner split o-ring is seated in a recess in the rotary holder half and a second split o-ring is situated against the outer wall of the nose, with a gasket joining the two split o-rings.

Two split o-rings 502 and 504 may be used to perform instead of the single split o-ring 500 as shown in FIG. 10. Split o-ring 502 seals between the shaft 20 and the rotary holder halves 102, 104 and split o-ring 504 seals between the outer periphery 218 of the seal face segments 206f and the rotary holder halves 102, 104. A gasket 510 is positioned to form a seal between the split o-rings 502, 504. The gasket 510 is required if the mating surfaces 126, 128 are not completely closed upon assembly. If the mating surfaces 126, 128 of rotary holder halves 102, 104 are machined smooth and permitted to close upon assembly, the gasket 510 is not used.

The ends of the split o-rings may be slightly displaced angularly from the rotary holder mating surfaces 126, 128. This slight offset provides a good seal against the shaft and prevents the o-ring from being caught between the mating surfaces of the holder halves. The ends of the split o-ring may be, for example, skive cut at an angle, ball and socket, tongue and groove or blunt.

A rotary seal component may have any one of the seal face geometries discussed or shown in the FIGs., with a suitable o-ring, in conjunction with a rotary holder that may or may not have an inner axial wall. An integral band, either conically or cylindrically shaped, may be used to clamp the seal face segments together and position them concentric with the shaft. A recess in the counterbore for receiving the nose may be placed at various axial positions along the counterbore and may be machined in either the inner or outer wall. The nose may be inserted into a recess in the outer wall or may bear directly against the back edge of the integral band. The rotary holder may have stress-relieved walls near the mating surfaces. Vibration damping strips may be included in slots in the rotary holder halves. Thus, the possible configurations produced by combining the various features described are numerous.

The rotary seal component may be in the form of a kit. Such a kit may include at least two rotary seal face segments, two rotary holder halves and a split o-ring. The seal face segments, rotary holder halves, and split o-ring may have any combination of the configurations discussed above. The rotary seal component kit may be utilized in a conventional mechanical split seal or in conjunction with the stationary gland discussed below.

Each stationary holder half 310, 312, otherwise known as gland halves, may contain a stationary face segment 406 resiliently mounted in a counterbore 322 as shown in FIG. 1. A split o-ring 506 may be mounted in an arcuate groove 324 in the counterbore 322 and may prevent the stationary seal face 400 from being axially withdrawn from the counterbore 322. The stationary seal face 400 may have a circumferential ridge 410 with a larger diameter than the inner periphery 507 of the split o-ring 506 in its uncompressed state. If an axial force is applied to withdraw the stationary seal face 400 from the holder half 310, 312, the ridge 410 contacts the o-ring 506 which forms a stop, tending to restrain the seal face 400 in the counterbore 322. The split o-ring 506 also seals between the stationary seal face 400 and the holder halves 310, 312 and presses radially inwardly against the stationary seal face 400, helping to position the face 400 concentric with the shaft 20.

Each holder half 310, 312 may include an inner axial wall 328. The inner axial wall 328 helps align the stationary seal face segments 406 normal to the shaft during assembly and installation. The wall 328 in conjunction with the ridge 410 and split o-ring 506, also retains the stationary seal face segments 406 in the holder halves 310, 312. The ridge 410 may be tapered to facilitate easy axial insertion of the ridge 410 past the inner periphery 507 of the split o-ring 506. The stationary component 40, thus, may comprise only two stationary component halves 306, 308 with no loose parts, except for fasteners.

A resilient support pushes the stationary primary sealing surface 408 away from the holder halves toward the rotary primary sealing surfaces 210. Such a resilient support may constitute compression springs 514 retained in the counterbore 322 by the seal face 400. Wave springs, canted coils, leaf springs and bands or resilient copolymers also may be used. If the counterbore has an inner axial wall 328, the wall 328 reduces the likelihood of the resilient support being dislodged.

For ease of assembly and for alignment, one of the mating surfaces 318 of one of the stationary holder halves 310 may have an aligning pin 330 that mates with a corresponding aligning hole on one of the mating surfaces 320 of the other stationary holder half 312. Gland bolts or other fasteners (not shown) connect the holder halves 310, 312 sealing gland mating surfaces 318, 320 together.

Figure 11:
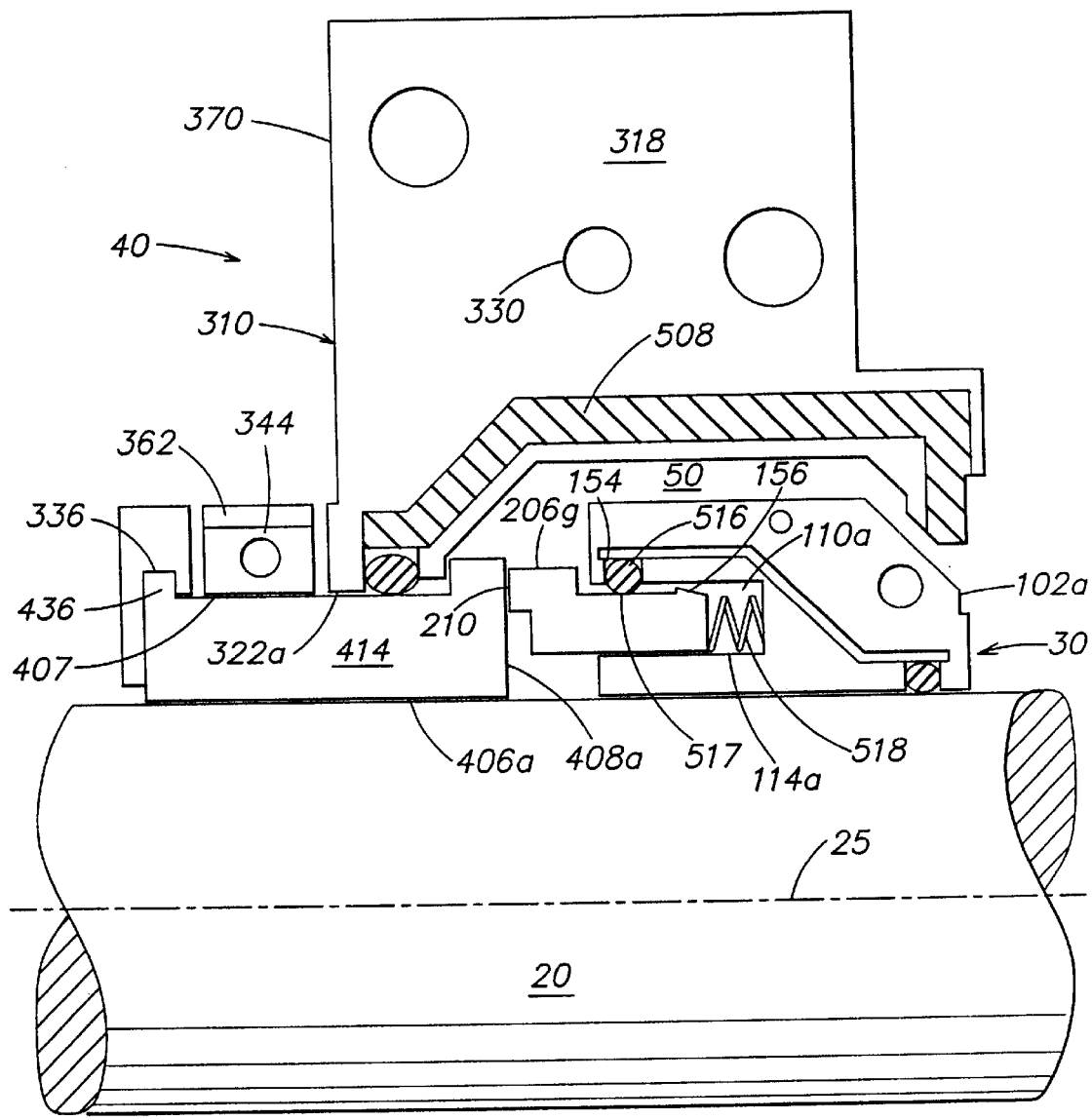
FIG. 11 is a side view of one quarter of a mechanical split seal assembly in which the stationary seal face is seated rigidly and the rotary seal face is mounted resiliently.
Figure 12:
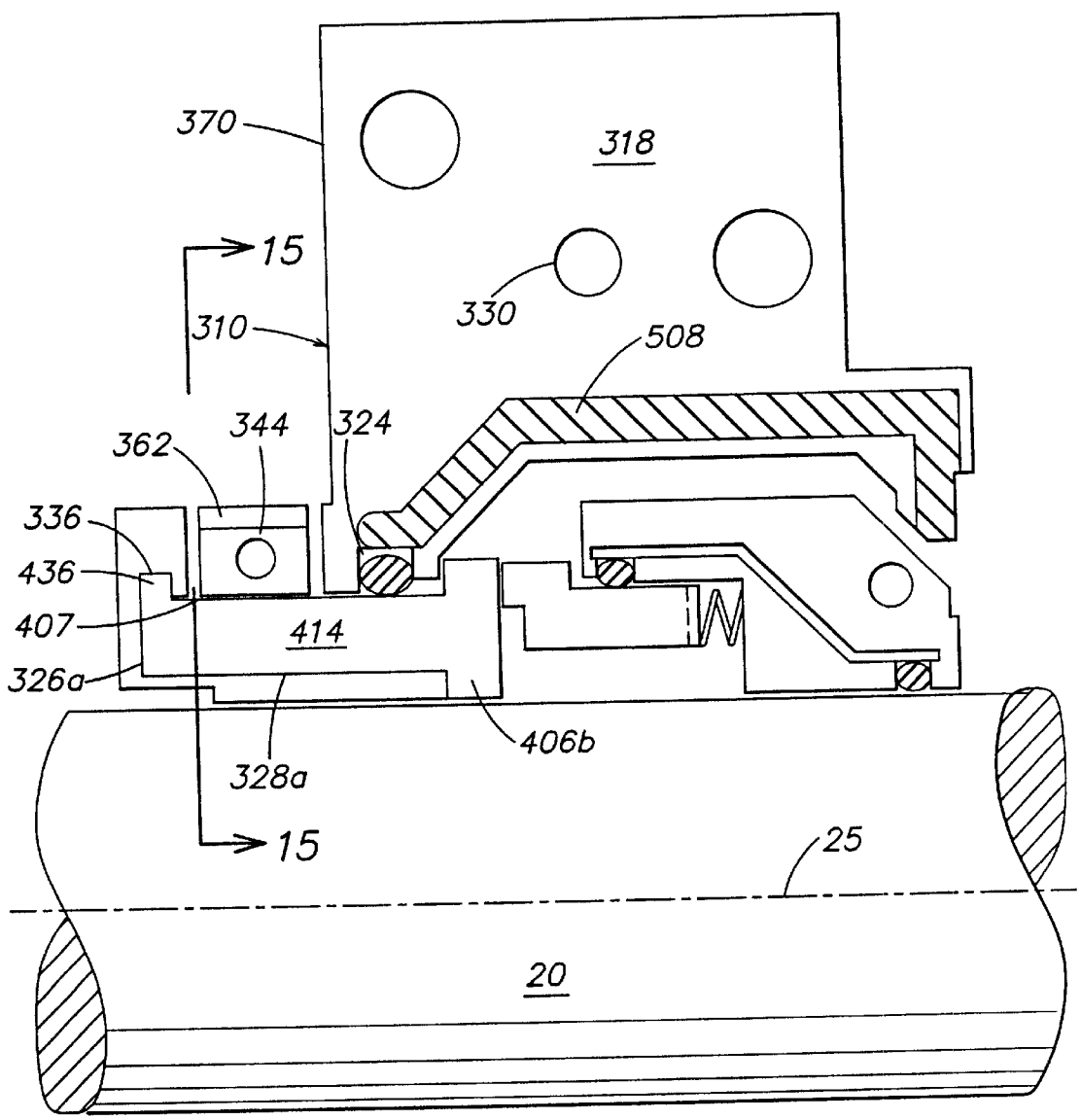
FIG. 12 is a side view of one quarter of a mechanical split seal assembly in which the stationary seal face is held in a channel.
Figure 13:
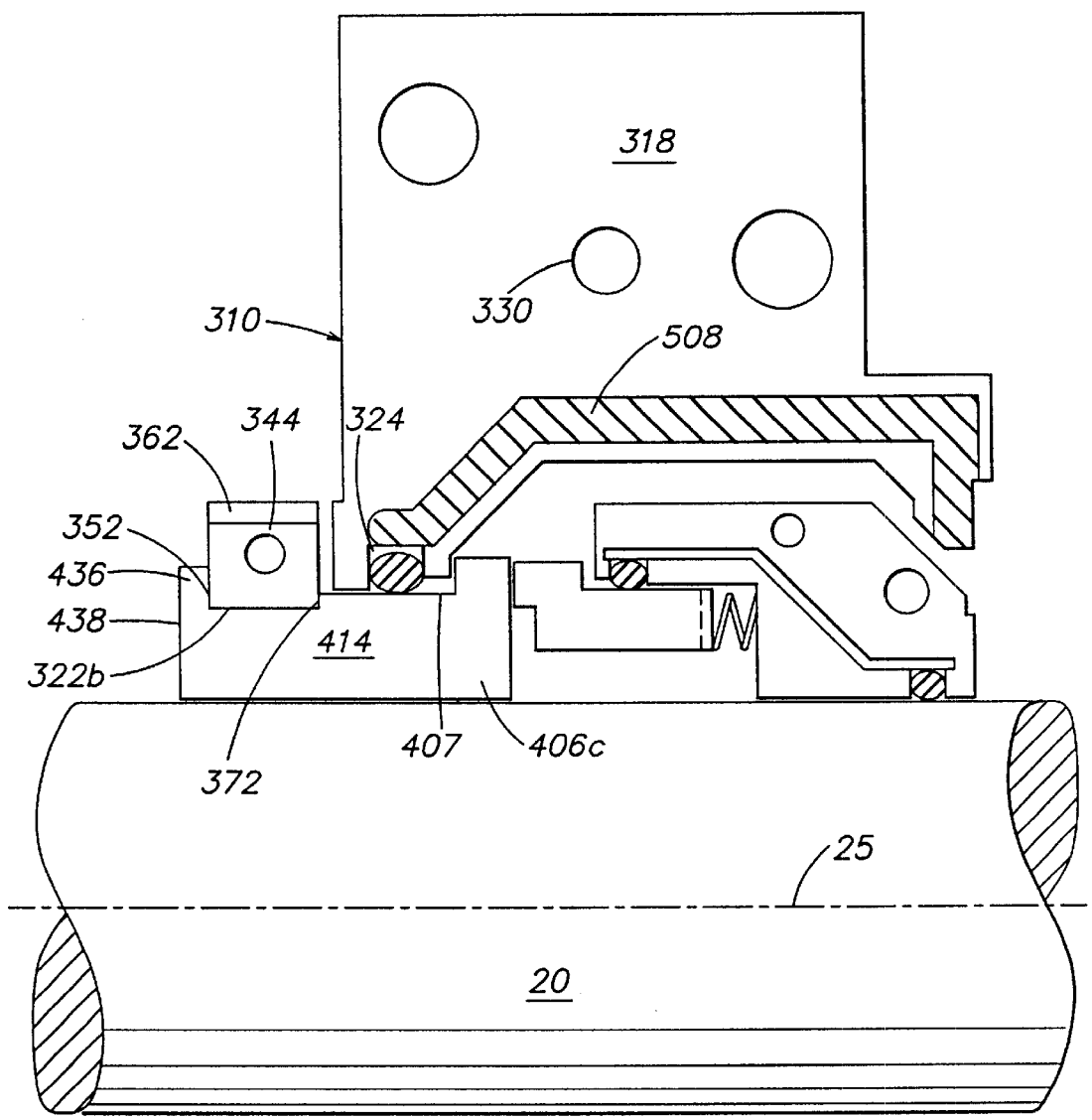
FIG. 13 is a side view of one quarter of a mechanical split seal assembly in which the stationary seal face bears axially against the front and back edges of the integral band.

Alternatively, the stationary face segments 406a may be held rigidly and the rotary seal face segments 206g may be mounted resiliently. As shown in FIG. 11, the stationary face segments 406a are held rigidly in a counterbore 322a. The stationary holder halves 310, 312 may have an inner axial wall 328a so that a channel 326a is formed in which the stationary face segment 406b is seated, as shown in FIG. 12. The stationary seal face segments 406b may be slid radially into the channel 326a. In another configuration, the holder halves 310, 312 may not have an inner axial wall as shown in FIG. 13.

Figure 14:
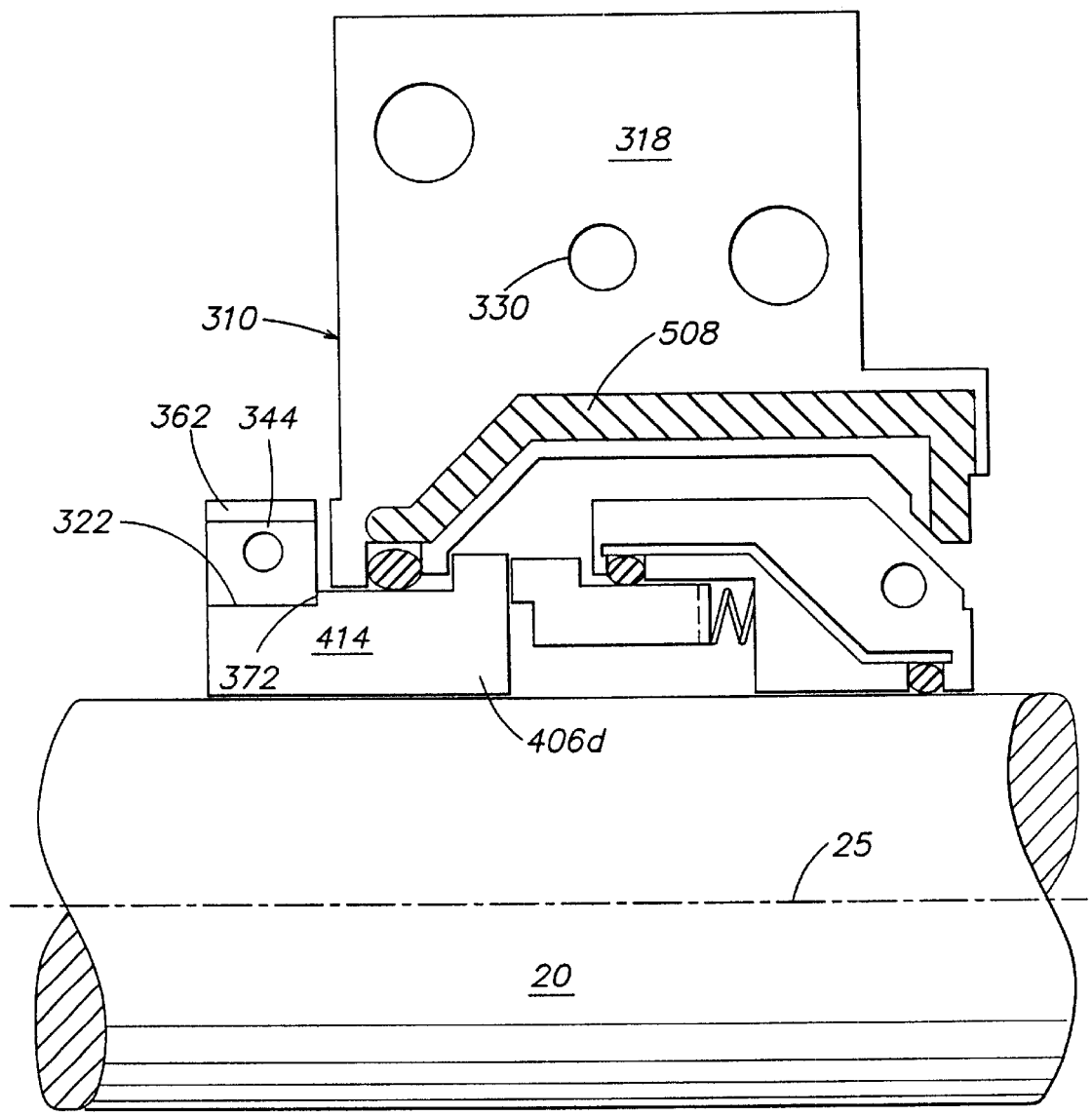
FIG. 14 is a side view of one quarter of a mechanical split seal assembly in which the stationary seal face does not have a nose.

A nose 436 may engage with a recess 336 as shown in FIGS. 11 and 12. Alternatively, the nose 436 may extend beyond the counterbore 322b so that it extends axially from the stationary holder halves 310, 312 as shown in FIG. 13. In either configuration the nose is axially supported along 360 degrees reducing distortion at the seal face under high pressures. The back radial surface 438 of the nose 436 may be used to axially align the stationary seal face segments 406c. In another configuration, the stationary seal face segments 406d do not have a nose 436 as shown in FIG. 14 and are restrained from dislodging axially toward the rotary component by a net force on the seal face in the opposing direction.

As shown in FIGS. 11–14, the stationary face segments 406a–d may be clamped concentrically by an integral band 342 configured similarly to that discussed above with respect to a rigidly mounted rotary seal face. Each stationary holder half 310, 312 may have an integral band 342 around the outer periphery 412 of a cylindrical section 414 of the seal face segments 406a–d. The integral bands 342 rigidly and securely hold the stationary face segments 406a–d together into a rigid non-split configuration concentric with the shaft 20, and reduce relative axial or radial movement between the stationary face segments 406a–d.

Figure 15:
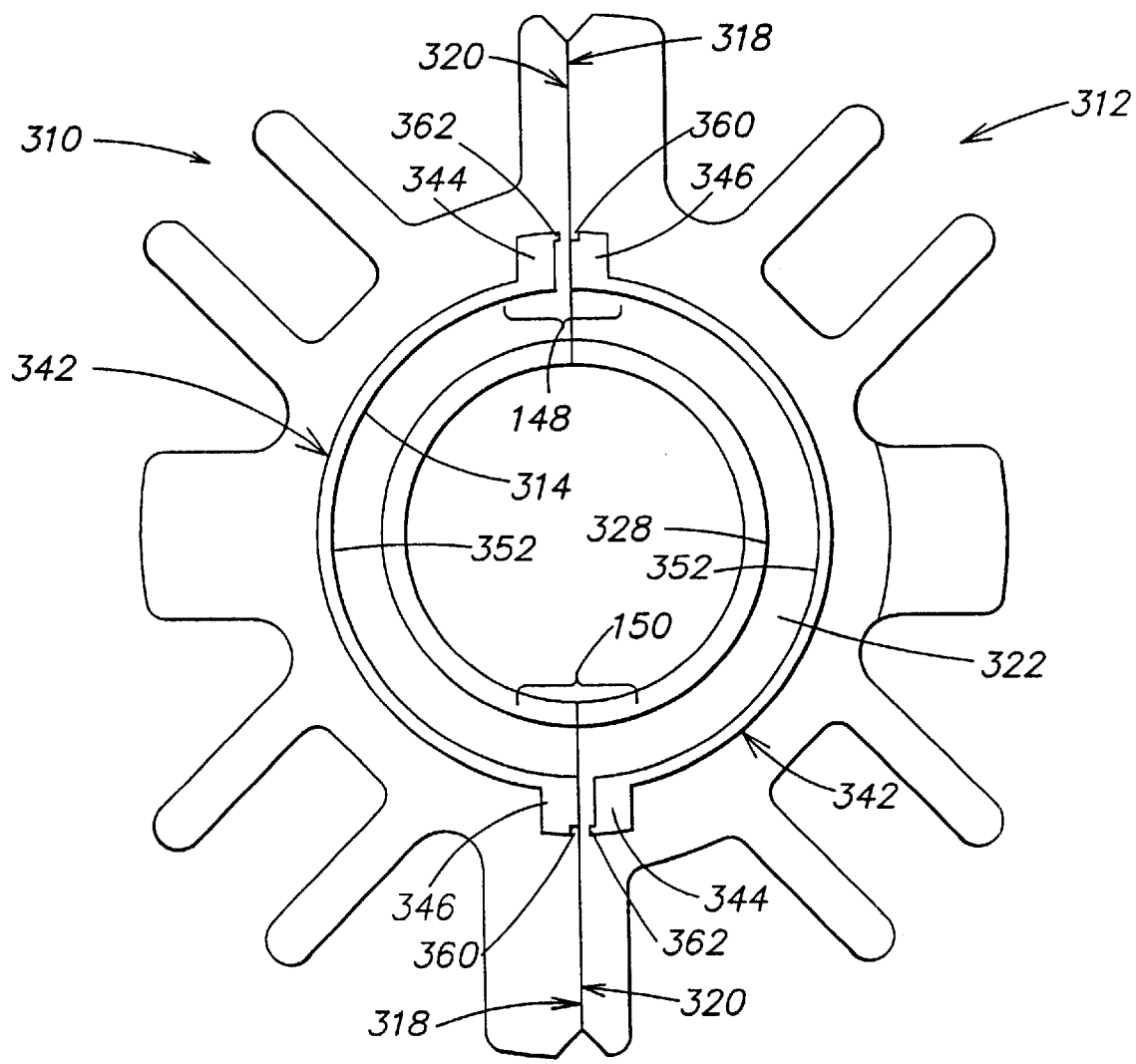
FIG. 15 is an axial view of the stationary seal component of FIG. 12 at section line 15—15 showing the integral bands that clamp around the seal face.

As shown in FIG. 15, the integral band 342 may form a section of the outer wall 314 of the counterbore 324. Each integral band 342 may be attached to each stationary holder half 310, 312 proximate one of the stationary holder mating surfaces 318, 320 and may be otherwise unattached. The cylindrically-shaped integral band 342 terminates in flanged sections 344, 346 normal to the shaft 20. Screws or other fastening devices (not shown) may be used to tighten the integral bands around the seal face. The back 352 and front edges of the integral band 342 may also serve as axial stops for the nose 436 extending outwardly from the seal face segments 406c as shown in FIG. 13.

FIG. 15 also illustrates that the outer axial wall 314 may have a stress-relieved region 348 close to the stationary holder mating surfaces 318, 320 to reduce or eliminate localized stresses. The inner axial wall 328 (if one is present) may also have a stress-relieved region 350. These regions 348, 350 provide the added advantage of facilitating easy insertion of the seal face segments 406a–d.

As shown in FIG. 11, each rotary holder half 102a, 104a may contain a rotary face segment 206g resiliently mounted in a counterbore 110a. A split o-ring 516 may be mounted in an arcuate groove 154 in the counterbore 110a and may prevent the rotary seal face segment 206g from being axially withdrawn from the counterbore 110a. Each rotary seal face segment 206g may have a ridge 156 with a larger diameter than the inner periphery 517 of the split o-ring 516 in its uncompressed state. If an axial force is applied to withdraw the rotary seal face segment 206g from the holder half 102a, 104a then the ridge 156 contacts the o-ring 516 which forms a stop, tending to retain the seal face 206g in the counterbore 110a. The split o-ring 516 also seals between the rotary seal face segments 206g and the holder halves 102a, 104a and presses radially inwardly against the rotary seal face segments 206g, helping to position the seal face concentric with the shaft 20.

Each holder half 102a, 104a may include an inner axial wall 114a. The inner axial wall 114a helps align the rotary seal face segments 206g normal to the shaft 20 during assembly and installation. The wall 114a in conjunction with the ridge 156 and split o-ring 516, also retains the rotary seal face segments 206g in the holder halves 102a, 104a. The ridge 156 may be tapered to facilitate easy axial insertion of the ridge 156 past the inner periphery 517 of the split o-ring 516. The rotary component 30, thus, may comprise only the two rotary component halves with no loose parts, except for fasteners.

A resilient support pushes the rotary primary sealing surface 208a toward the stationary primary sealing surface 408a. Such a resilient support may constitute compression springs 518 retained in the counterbore 110a by the seal face segments 206g. Wave springs, canted coils, leaf springs and bands or resilient copolymers also may be used. If the counterbore 110a has an inner axial wall 114a, the wall 114a reduces the likelihood of the resilient support being dislodged.

One of the advantages of the split seal assembly is the ease of assembly and installation. The method of assembly depends on the particular seal configuration. In a split seal assembly in which the rotary face 200 is mounted rigidly and the stationary face 400 is mounted resiliently, the assembly steps for the rotary component 30 include the following. First, the split o-ring 500 is positioned, preferably adhered to each seal face segment 206. Next the rotary seal face segments 206 are slid radially into the rotary holder halves 102, 104 with the noses 214 mounted in the holder halves 102, 104. The two rotary holder halves 102, 104 may then be affixed around the shaft 20. The aligning pins 122 may be inserted into the corresponding aligning holes 124. Unlike conventional split seal assemblies, the face segments 206 do not need to be shifted radially so that the split 202 between the face segments 206 is offset with the junction 130 of the rotary holder mating surfaces 126, 128.

A shimming device 602 may be used to set the axial alignment of the face segments 206, as shown in FIG. 6. To ensure that the face segments are satisfactorily aligned, a finger may be passed over the junction 130 and the face segments 206 may be pressed toward the shimming device 602 until the no misalignment is felt between the face segments. Then, the shimming device 602 may be removed and the mating surfaces may be fastened together. Fasteners may be inserted through holes 164 and 166 shown in FIG. 3, and tightened. Finally, integral bands 136 of the rotary holder halves 102, 104 may be tightened one to another to position the rotary seal face 200 concentrically around the shaft 20.

In a rotary component without an inner axial wall 114, the rotary seal face segments 206 may not necessarily have to be slid radially into the rotary holder halves 102, 104. When no inner axial wall 114 is employed, the rotary seal face segments 206, may be positioned around the shaft 20 and then may be surrounded by the rotary holder halves 102, 104. A snap ring (not shown) may be placed around rotary seal face segments 206 to hold them while the rotary holder halves 102, 104 are positioned. However, if the fit between the nose 214 and a recess 120 is very close, it may be easier to slide the seal face segments 206 radially into the holder halves 102, 104 even when there is no inner axial wall.

The resiliently-mounted stationary component 40 may be assembled as follows. A biasing device such as compression springs 514 or wave springs may be placed in the counterbore 322 of each gland half 310, 312. Next a split o-ring 506 may be set into a groove 324 in the outer wall 314 of the counterbore 322. Finally, the stationary seal face 400 may be inserted axially into the counterbore 322 so that the ridge 410 of the stationary seal face 400 pushes past and is held within the counterbore 322 by the split o-ring 506. The gland halves 310, 312 with the gasket 508 installed in the mating surface 318 then may be placed around the rotary component 30 and sealed so that the rotary and stationary primary sealing surfaces 210, 408 are in biased contact with one another.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A split seal component, usable for assembly in a split seal, comprising:

a circular seal face including two seal face segments and having a primary sealing surface, an inner wall and an outer wall with an outer periphery;

a first holder half which, prior to such assembly, includes at least a first attached band section cantilevered therefrom and having a free end extending from a fixed end attached to the first holder half; and a second holder half which, prior to such assembly, includes at least a second attached band section cantilevered therefrom and having a free end extending from a fixed end attached to the second holder half;

prior to any attachment of the end of one band section to the end of another band section, each holder half including one said band section attached to the holder half, the first and second attached band sections positionable around a portion of said outer periphery when assembled in said split seal.

2. A split seal component as in claim 1, wherein each holder half includes one said attached band section formed integrally with the holder half.

3. A split seal component as in claim 1, wherein the free end of each attached band section is configured for attachment to the fixed end of a different attached band section.

4. A split seal component as in claim 1, additionally including attachment devices to enable each free end of an attached band section to be attached to a fixed end of a different attached band section, to enable the attached band sections to surround and clamp a portion of the outer periphery of the circular seal face.

5. A split seal component as in claim 4, wherein said attachment devices are screws inserted through a hole in the free end of an attached band section into a fixed end of a different attached band section and tightened to clamp the attached band sections circumferentially around said outer periphery.

6. A split seal component as in claim 1, additionally including a split o-ring positioned against at least one of said inner and outer walls.

7. A split seal component as in claim 6, which is usable on a shaft with an outer diameter and wherein said inner wall includes a first portion with inner diameter approximating the outer diameter of a shaft and a second portion with a larger inner diameter, and said split o-ring is positioned against said second portion of the inner wall.

8. A split seal component as in claim 6, wherein said split o-ring is formed of one of elastomeric or other material.

9. A split seal component as in claim 1, wherein each holder half has an annular portion positionable adjacent to a shaft and an axially-extending channel between an inner axial wall of the annular portion and an outer axial wall, said channel configured to contain at least a portion of a seal face segment.

10. A split seal component as in claim 1, wherein said first and second holder halves are configured for one of rotation with a rotating shaft and stationary mounting in relation to a rotating shaft.

11. A seal component, usable for assembly in a seal with a seal face having an outer wall with an outer periphery, comprising:
   a support device, and
   at least two attached band sections cantilevered from said support device, each with a free end extending from a fixed end attached to the support device prior to any attachment between band section ends, the attached band sections positionable adjacent a portion of the outer periphery of the seal face;
   the free end of each attached band section configured for attachment to fixed end of the other attached band section.

12. A seal component as in claim 11, wherein said attached band section is formed integrally with the support device.

13. A seal component as in claim 11, wherein there are two attached band sections cantilevered from the support device and the free end of each attached band section is configured for attachment to the fixed end of the other attached band section.

14. A seal component as in claim 11, wherein:
   each attached band section has a curved portion and end extensions at said free and fixed ends which extend from a convex side of said curved portion;
   the curved portion of each attached band section has a width, a thickness and at least limited flexibility; and
   each end extension has a width, a thickness greater than said curved portion thickness and reduced flexibility relative to the curved portion.

15. A seal component as in claim 14, wherein the curved portion of each attached band section approximates an arc of a circle and said end extensions extend radially outward therefrom.

16. A seal component as in claim 14, wherein the thickness of each end extension is at least twice the thickness of each curved portion.

17. A split seal component, usable for assembly in a split seal with a seal face having an outer wall with an outer periphery, comprising:
   a device separable into first and second half sections; and
   a first attached band section cantilevered from the first half section and having a free end extending from a fixed end attached to the first half section prior to such assembly; and
   a second attached band section cantilevered from the second half section and having a free end extending from a fixed end attached to the second half section prior to such assembly;
   prior to any attachment of the end of one band section to the end of another band section, each holder half including one said band section attached to the holder half, the first and second attached band sections positionable adjacent a portion of the outer periphery of the seal face when assembled in said split seal.

18. A split seal component as in claim 17, wherein each half section includes one said attached band section formed integrally with each said half section.

19. A split seal component as in claim 17, wherein the free end of each attached band section is configured for attachment to the fixed end of a different attached band section.

20. A split seal component as in claim 17, wherein:
   each attached band section has a curved portion and end extensions at said free and fixed ends which extend from a convex side of said curved portion;
   the curved portion of each attached band section has a width, a thickness and at least limited flexibility; and
   each end extension has a width, a thickness greater than said curved portion thickness and reduced flexibility relative to the curved portions.

21. A split seal component as in claim 20, wherein the curved portion of each attached band section approximates an arc of a circle and said end extensions extend radially outward therefrom.

22. A split seal component as in claim 20, wherein the thickness of each end extension is at least twice the thickness of each curved portion.

23. A split seal component as in claim 17, wherein each half section has an annular portion positionable adjacent to a shaft and an axially-extending channel between an inner axial wall of the annular portion and an outer axial wall, said channel configured to contain at least a portion of a seal face segment.

24. A method of assembly of a split seal component, comprising:
   (a) providing first and second holder halves each including at least one attached band section cantilevered therefrom with a free end extending from a fixed end attached to the holder half, said fixed end being so attached prior to any attachment between band section ends;
   (b) providing two seal face segments;
   (c) inserting a seal face segment into each holder half;
   (d) placing the holder halves around a shaft; and
   (e) fastening the free end of each attached band section to the fixed end of the other attached band section.

25. A method as in claim 24, additionally comprising:
   fastening the first holder half to the second holder half.

26. A method as in claim 24, additionally comprising:
   positioning a split o-ring between an inner wall of said seal face segments and said shaft before fastening the attached band sections.

27. A method of assembly of a split seal component including two seal face segments, comprising:
   (a) providing a support device having at least two attached band sections cantilevered therefrom, each with a free end extending from a fixed end attached to the support device, said fixed end being so attached prior to any attachment between band section ends;
   (b) placing the attached band section around the two seal face segments positioned around a shaft; and
   (c) fastening the free end of each attached band section to the fixed end of the other attached band section.

28. A method as in claim 27, wherein said support device includes first and second half sections and additionally comprising:
   fastening the first half section to the second half section.

29. A method as in claim 27, wherein said at least one attached band section comprises two attached band sections and in step (c) the free end of each attached band section is fastened to the fixed end of the other attached band section.

30. A method as in claim 27, additionally comprising:
    positioning a split o-ring between an inner wall of the seal face segments and said shaft before fastening the at least one attached band section.

31. A split seal assembly comprising:
    a first seal component as in claim 1, and
    a second seal component including a resiliently mounted seal face.

* * * * *